(12) United States Patent
Amirparviz (10) Patent No.: US 8,743,464 B1
(45) Date of Patent: *Jun. 3, 2014

(54) WAVEGUIDE WITH EMBEDDED MIRRORS

(75) Inventor: Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/938,669

(22) Filed: Nov. 3, 2010

(51) Int. Cl.
*G02B 27/14* (2006.01)
*G02B 27/01* (2006.01)

(52) U.S. Cl.
CPC ............ *G02B 27/01* (2013.01); *G02B 27/0101* (2013.01); *G02B 27/0172* (2013.01)
USPC ....................................................... 359/633

(58) Field of Classification Search
CPC ............... G02B 27/01; G02B 27/0172; G02B 27/0101; G02B 6/00; G02B 27/0103
USPC ........... 359/15, 315, 317, 618, 629, 630, 633, 359/634.637, 65; 349/65; 345/6–8
See application file for complete search history.

(56) References Cited

U.S. PATENT DOCUMENTS

| | | | |
|---|---|---|---|
| 4,711,512 A | 12/1987 | Upatnieks | |
| 5,076,664 A | 12/1991 | Migozzi | |
| 5,093,567 A | 3/1992 | Staveley | |
| 5,323,477 A * | 6/1994 | Lebby et al. ................... | 385/129 |
| 5,539,422 A | 7/1996 | Heacock et al. | |
| 5,696,521 A | 12/1997 | Robinson et al. | |
| 5,715,337 A | 2/1998 | Spitzer et al. | |
| 5,724,463 A | 3/1998 | Deacon et al. | |
| 5,734,357 A | 3/1998 | Matsumoto | |
| 5,771,124 A | 6/1998 | Kintz et al. | |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |

(Continued)

FOREIGN PATENT DOCUMENTS

| | | |
|---|---|---|
| EP | 1 736 812 A1 | 12/2006 |
| GB | 2272980 A | 6/1994 |

(Continued)

OTHER PUBLICATIONS

Mukawa, Hiroshi et al., "8.4: Distinguished Paper: A Full Color Eyewear Display using Holographic Planar Waveguides", SID Symposium Digest of Technical Papers, May 2008, pp. 89-92, vol. 39, Issue 1.

(Continued)

*Primary Examiner* — Thomas K Pham
*Assistant Examiner* — Vipin Patel
(74) *Attorney, Agent, or Firm* — Blakely, Sokoloff Taylor & Zafman LLP (57) ABSTRACT

A waveguide with embedded mirrors includes an in-coupling region for receiving input light into the waveguide and an out-coupling region for emitting output light from the waveguide. The mirrors include a plurality of in-coupling mirrors disposed within the in-coupling region of the waveguide and orientated to reflect the input light down the waveguide towards the out-coupling region as guided light. The mirrors further include a plurality of out-coupling mirrors disposed within the out-coupling region of the waveguide and orientated to reflect the guided light out of the waveguide as the output light.

24 Claims, 7 Drawing Sheets

(56) References Cited

U.S. PATENT DOCUMENTS

| | | |
|---|---|---|
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,271,808 B1 | 8/2001 | Corbin |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,522,794 B1 | 2/2003 | Bischel et al. |
| 6,538,799 B2 | 3/2003 | McClelland et al. |
| 6,587,611 B1 * | 7/2003 | Hunt .................................. 385/18 |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 * | 12/2004 | Amitai ............................ 359/630 |
| 6,879,354 B1 * | 4/2005 | Sawayama et al. ............... 349/63 |
| 6,879,443 B2 | 4/2005 | Spitzer et al. |
| 6,903,876 B2 | 6/2005 | Okada et al. |
| 7,021,777 B2 | 4/2006 | Amitai |
| 7,158,096 B1 | 1/2007 | Spitzer |
| 7,242,527 B2 | 7/2007 | Spitzer et al. |
| 7,346,260 B2 | 3/2008 | Arakida et al. |
| 7,391,573 B2 | 6/2008 | Amitai |
| 7,457,040 B2 | 11/2008 | Amitai |
| 7,502,168 B2 | 3/2009 | Akutsu et al. |
| 7,513,670 B2 | 4/2009 | Yang et al. |
| 7,545,569 B2 | 6/2009 | Cassarly |
| 7,576,916 B2 | 8/2009 | Amitai |
| 7,577,326 B2 | 8/2009 | Amitai |
| 7,595,933 B2 | 9/2009 | Tang |
| 7,643,214 B2 | 1/2010 | Amitai |
| 7,663,805 B2 | 2/2010 | Zaloum et al. |
| 7,672,055 B2 | 3/2010 | Amitai |
| 7,674,028 B2 | 3/2010 | Cassarly et al. |
| 7,724,441 B2 | 5/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,843,403 B2 | 11/2010 | Spitzer |
| 7,876,489 B2 | 1/2011 | Gandhi et al. |
| 7,900,068 B2 | 3/2011 | Weststrate et al. |
| 7,949,214 B2 * | 5/2011 | DeJong .......................... 385/31 |
| 8,004,765 B2 | 8/2011 | Amitai |
| 8,189,263 B1 | 5/2012 | Wang et al. |
| 8,212,744 B2 * | 7/2012 | Kuo et al. ......................... 345/8 |
| 8,446,675 B1 | 5/2013 | Wang et al. |
| 2001/0021058 A1 | 9/2001 | McClelland et al. |
| 2001/0022682 A1 | 9/2001 | McClelland et al. |
| 2003/0090439 A1 | 5/2003 | Spitzer et al. |
| 2005/0174651 A1 | 8/2005 | Spitzer et al. |
| 2006/0132914 A1 | 6/2006 | Weiss et al. |
| 2006/0192306 A1 | 8/2006 | Giller et al. |
| 2006/0192307 A1 | 8/2006 | Giller et al. |
| 2007/0047091 A1 | 3/2007 | Spitzer et al. |
| 2007/0103388 A1 | 5/2007 | Spitzer |
| 2008/0002427 A1 | 1/2008 | Kropac et al. |
| 2008/0106775 A1 | 5/2008 | Amitai |
| 2008/0151379 A1 | 6/2008 | Amitai |
| 2008/0186604 A1 | 8/2008 | Amitai |
| 2008/0198471 A1 | 8/2008 | Amitai |
| 2008/0219025 A1 | 9/2008 | Spitzer et al. |
| 2008/0247722 A1 | 10/2008 | Van Gorkom et al. |
| 2008/0278812 A1 | 11/2008 | Amitai |
| 2008/0285137 A1 * | 11/2008 | Simmonds et al. ........... 359/630 |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0141324 A1 | 6/2009 | Mukawa |
| 2009/0161383 A1 | 6/2009 | Meir et al. |
| 2009/0237804 A1 | 9/2009 | Amitai et al. |
| 2009/0257108 A1 * | 10/2009 | Gruhlke et al. ................ 359/290 |
| 2010/0046070 A1 | 2/2010 | Mukawa |
| 2010/0046219 A1 | 2/2010 | Pijlman et al. |
| 2010/0103078 A1 | 4/2010 | Mukawa et al. |
| 2010/0149073 A1 | 6/2010 | Chaum et al. |
| 2010/0157433 A1 | 6/2010 | Mukawa et al. |
| 2010/0171680 A1 | 7/2010 | Lapidot et al. |
| 2010/0278480 A1 | 11/2010 | Vasylyev |
| 2010/0321409 A1 | 12/2010 | Komori et al. |
| 2011/0007277 A1 | 1/2011 | Solomon |
| 2011/0213664 A1 | 9/2011 | Osterhout et al. |

FOREIGN PATENT DOCUMENTS

| | | |
|---|---|---|
| JP | 2011-118402 | 6/2011 |
| WO | WO96/05533 A1 | 2/1996 |
| WO | WO 99/46619 A | 9/1999 |
| WO | WO 2010/092409 A1 | 8/2010 |

OTHER PUBLICATIONS

Levola, Tapani, "Diffractive Optics for Virtual Reality Displays", Academic Dissertation, University of Joensuu, Department of Physics, Vaisala Laboratory, 2005, 26 pages.

Cakmakci, Ozan et al., "Head-Worn Displays: A Review", Journal of Display Technology, Sep. 2006, 20 pages, vol. 2, Issue 3.

Takahashi, Christopher et al., "Polymeric Waveguide Design of a 2D Display System", Proceedings of SPIE, 2006, vol. 6177, 617-719, 9 pages.

Aye, Tin M., "Miniature Guided Light Array Sequential Scanning Display for Head Mounted Displays", U.S. Army CECOM, May 15, 1998, 35 pages.

* cited by examiner

WAVEGUIDE WITH EMBEDDED MIRRORS

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Military applications include tactical displays of maps and thermal imaging. Other application fields include video games, transportation, and telecommunications. Due to the infancy of this technology, there is certain to be new found practical and leisure applications as the technology evolves; however, many of these applications are limited due to the cost, size, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus, system and method for fabrication of a waveguide with embedded mirrors are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
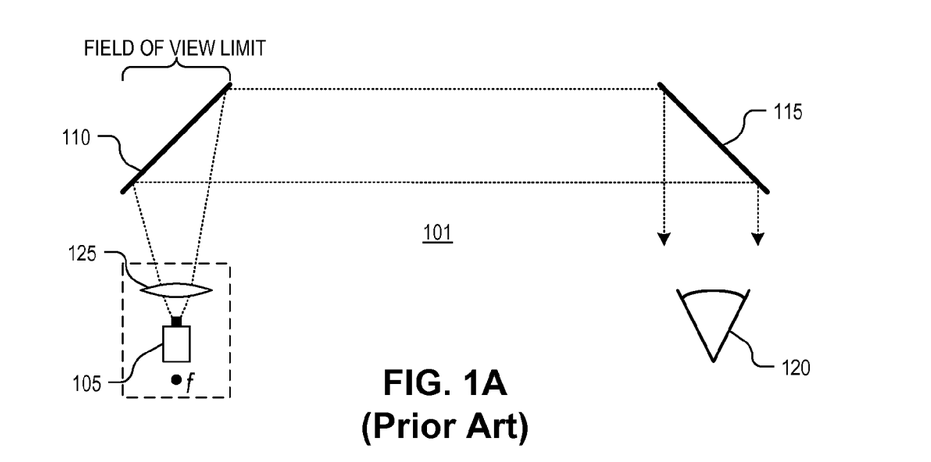
FIG. 1A illustrates a first conventional near-to-eye optical system using an input lens and two mirrors.

FIG. 1A illustrates a first conventional near-to-eye optical system 101 using an input lens and two mirrors. An image source 105 outputs an image that is reflected by two mirrors 110 and 115, which form an image near to eye 120. Image source 105 is typically mounted above the head or to the side of the head, while mirrors 110 and 115 bend the image around the front of the viewer's face to their eye 120. Since the human eye is typically incapable of focusing on objects placed within a few centimeters, this system requires a lens 125 interposed between the first mirror 110 and image source 105. Lens 125 creates a virtual image that is displaced further back from the eye than the actual location of mirror 115 by positioning image source 105 inside of the focal point f of lens 125. Optical system 101 suffers from a small field of view (e.g., approximately 20 degrees) limited by the extent of mirrors 110 and 115 and the bulkiness of lens 125. The field of view can be marginally improved by placing mirrors 110 and 115 within a high index material to compress the angles of incidence, but is still very limited.

Figure 1B:
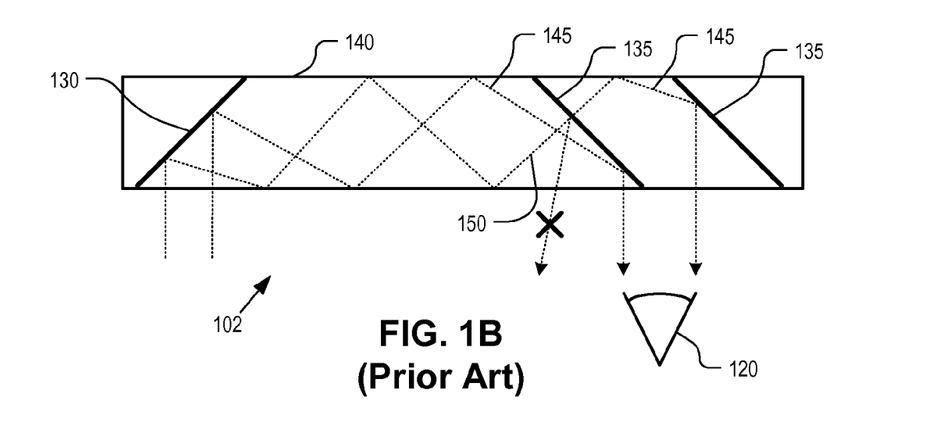
FIG. 1B illustrates a second conventional near-to-eye optical system using angle sensitive dichroic mirrors.

FIG. 1B illustrates a second conventional near-to-eye optical system 102 using angle sensitive dichroic mirrors. Optical system 102 includes a single in-coupling mirror 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output mirrors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 135 that passes some incident angles while reflecting others limits the field of view optical system 102.

Figure 1C:
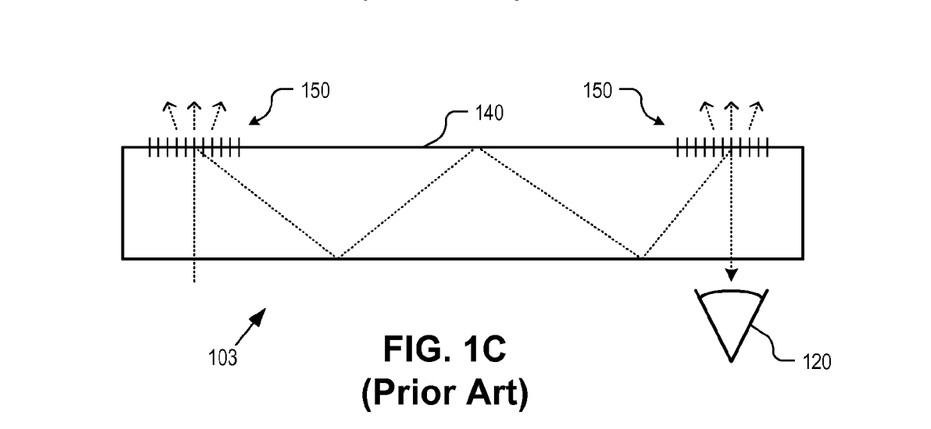
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of mirrors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is difficult and/or costly. Again, optical system 103 suffers from a limited field of view.

Figure 2A:
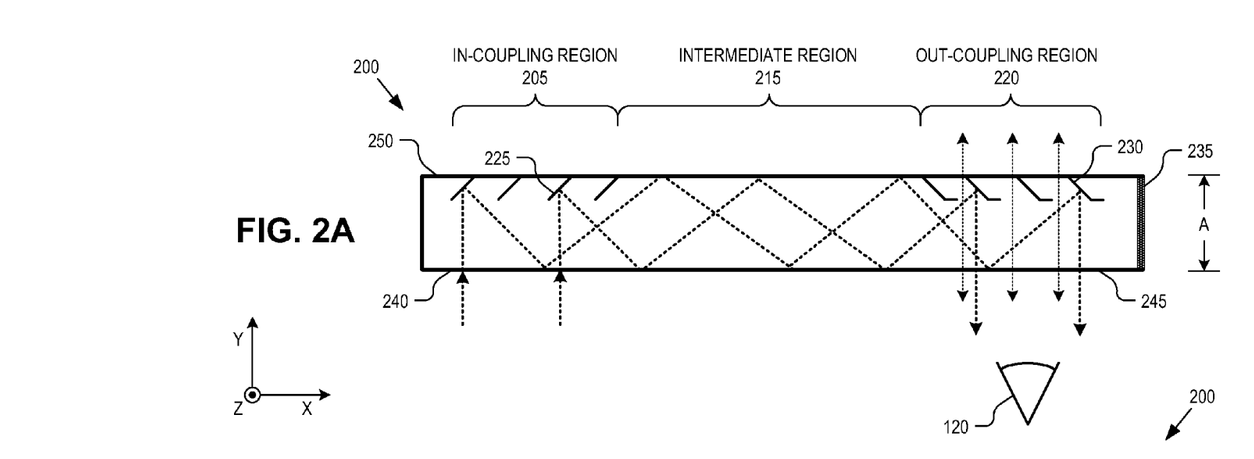
FIG. 2A is a top view illustrating a waveguide with embedded mirrors for generating a near-to-eye image, in accordance with an embodiment of the invention.
Figure 2B:
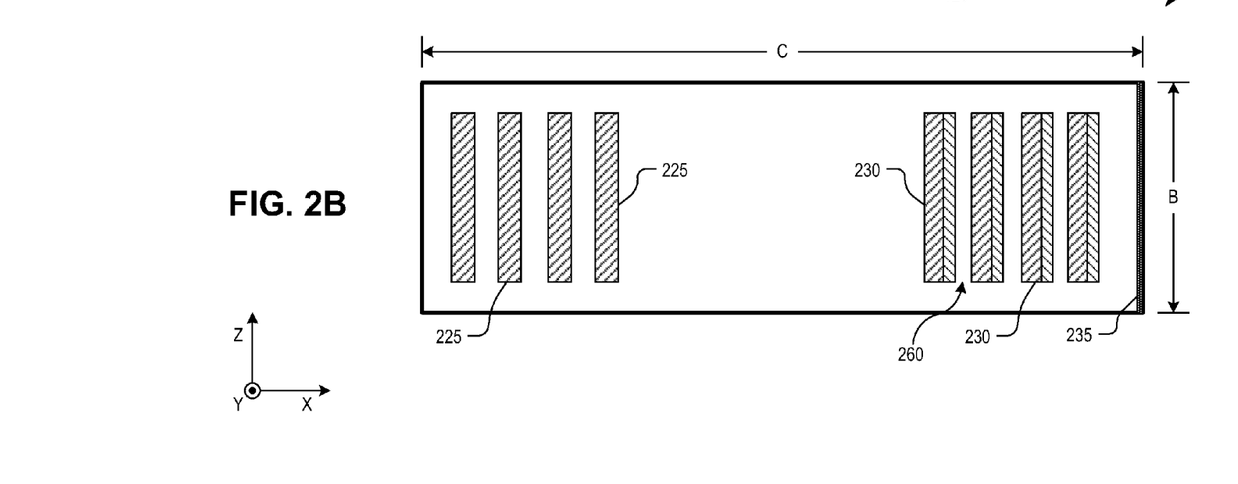
FIG. 2B is a side view illustrating a waveguide with embedded mirrors for generating a near-to-eye image, in accordance with an embodiment of the invention.

FIGS. 2A and 2B illustrate a waveguide 200 with embedded mirrors for generating a near-to-eye image, in accordance with an embodiment of the invention. FIG. 2A is a top or plan view while FIG. 2B is a side view of the same. The illustrated embodiment of waveguide 200 includes an in-coupling region 205, an out-coupling region 210, and an intermediate region 215. The illustrated embodiment of in-coupling region 205 includes in-coupling mirrors 225. The illustrated embodiment of out-coupling region 220 includes out-coupling mirrors 230 and end cap surface 235.

Waveguide 200 operates by receiving collimated input light into waveguide 200 at in-coupling region 205. The input light is reflected by in-coupling mirrors 225. In-coupling mirrors 225 are orientated to reflect the input light down waveguide 200 towards out-coupling region 220. The reflected input light is guided towards out-coupling region 220 by intermediate region 215. In-coupling mirrors include reflective surfaces that are angled oblique to light incident surface 240. In one embodiment, in-coupling mirrors 225 are angled relative to the input light and sides of waveguide 200 such that the reflected input light strikes the sides of waveguide 200 with sufficiently oblique angles that it is guided down waveguide 200 via total internal reflection ("TIR"). In one embodiment, one or more metallic reflective layers (not illustrated) are coated along the sides of waveguide 200, including intermediate region 215, to guide the light. A combination of both TIR and metallic reflective coatings may also be used. The guided light eventually reaches out-coupling region 220 where it is once again reflected by out-coupling mirrors 230. Out-coupling mirrors 230 are orientated to reflect the guided light for exit out emission surface 245 within out-coupling region 220 towards eye 120. In one embodiment, each out-coupling mirror 230 includes a reflective surface that is orientated such that the guided light received from intermediate region 215 strikes the side of waveguide 200 with an angle sufficiently close to normal such that the light is output from waveguide 200 towards eye 120.

Waveguide 200 may be fabricated of a variety of optically transmissive, light guiding materials, such as polymer, quartz, glass, etc. In one embodiment that uses TIR to guide light through intermediate region 215, waveguide 200 is fabricated of a polymer material having an index of refraction of approximately 1.5. The dimensions of waveguide 200 may be adjusted for a particular application; however, example dimensions may include A=1 mm to 15 mm, B=10 mm to 40 mm, and C=20 mm to 70 mm. Of course, other dimensions may be used and may vary based on application, aesthetic design choices, intended user size, etc. It should be appreciated that the figures are not drawn to scale.

In-coupling region 205 includes a plurality of offset in-coupling mirrors 225 each for reflecting a different portion of the input light image. FIGS. 2A and 2B illustrate each in-coupling mirror 225 as being an elongated structure with a rectangular flat/planar reflective surface orientated obliquely to light incident surface 240. These structures may be disposed along a planar surface, such as front side surface 250. However, it should be appreciated that in-coupling mirrors 225 may be embedded within in-coupling region 205 in a variety of other configurations, as long as, they are offset from one another to each reflect a different portion of the input image. In one embodiment, the in-coupling mirror structures have a substantially triangular cross-section (e.g., see FIG. 3A). However, embodiments of in-coupling mirrors 225 may be implemented with other structures having different cross-sectional shapes and one or more flat reflective surfaces. Furthermore, although FIGS. 2A and 2B illustrate four in-coupling mirrors 225, embodiments may be implemented with fewer or greater numbers of offset in-coupling mirrors 225 (e.g., five in-coupling mirrors).

Out-coupling region 220 includes a plurality of offset out-coupling mirrors 230 each for reflecting a different portion of the guided light for emission from waveguide 200. FIGS. 2A and 2B illustrate each out-coupling mirror 230 as being an elongated structure with two rectangular flat/planar reflective surfaces: one orientated obliquely to emission surface 245 and the other orientated substantially parallel with emission surface 245. These structures may be disposed along a planar surface, such as front side surface 250. However, it should be appreciated that out-coupling mirrors 230 may be embedded within out-coupling region 220 in a variety of other configurations, as long as, they are offset from one another to each reflect a different portion of the guide light. In one embodiment, the out-coupling mirror structures have a substantially parallelogram cross-section (e.g., see FIG. 4). However, embodiments of out-coupling mirrors 230 may be implemented with other structures having different cross-sectional shapes and one or more flat reflective surfaces. Furthermore, although FIGS. 2A and 2B illustrate four out-coupling mirrors 230, embodiments may be implemented with fewer or greater numbers of offset in-coupling mirrors 225 (e.g., five in-coupling mirrors). In one embodiment, the number of out-coupling mirrors 230 is the same as the number of in-coupling mirrors 225.

In one embodiment, the offset width between adjacent out-coupling mirrors 230 is selected to permit external light to pass through waveguide 200 between out-coupling mirrors 230 and reach the eye 120. In this regard, the eye 120 is able to see a real world image from the external light passing through waveguide 200 augmented by another image guided through waveguide 200. The other image may typically be CGI for superimposing over a user's real world vision. The degree of transparency may be controlled based on a ratio of areas of out-coupling mirrors 230 and intervening gaps 260 between out-coupling mirrors 230.

End cap surface 235 inhibits backward reflections propagating towards in-coupling region 205 by discouraging reflections off the right distal end of waveguide 200. In one embodiment, end cap surface 235 is implemented as a light absorbing surface (e.g., a dark matte surface). In one embodiment, end cap surface 235 is implemented as a light scattering surface (e.g., a rough, diffusive surface). In one embodiment, end cap surface 235 is an anti-reflective surface (e.g., AR coating) to permit guided light that reaches the distal end to pass out of the waveguide with reduced back reflections. Of course, end cap surface 235 may include combinations of the above possible embodiments.

Figure 3A:
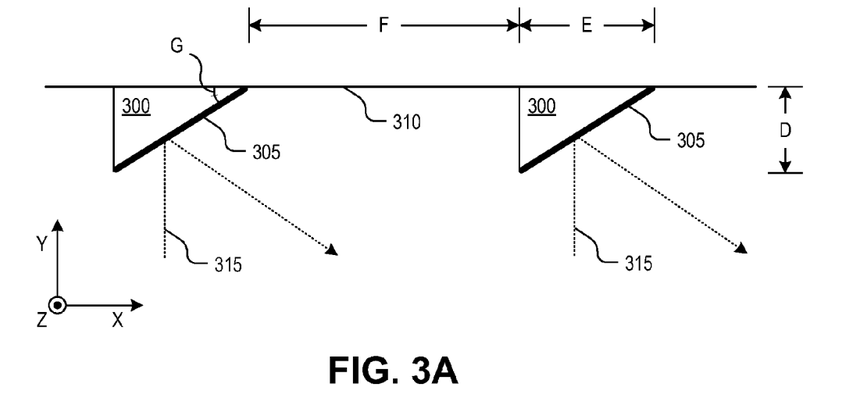
FIG. 3A is a top view illustrating in-coupling mirrors, in accordance with an embodiment of the invention.

FIG. 3A is a top view illustrating in-coupling mirrors 300, in accordance with an embodiment of the invention. In-coupling mirrors 300 represent one possible implementation of in-coupling mirrors 225. The illustrated embodiment of in-coupling mirrors 300 are structures each having a substantially triangular cross-section with a flat reflective surface 305 orientated obliquely to light incident surface 240 (see FIG. 2A). These structures are disposed along a planar surface 310 and offset from one another to reflect a different portion of input light 315. In one embodiment, reflective surfaces 305 are non-optically-transmissive surfaces. For example, reflective surfaces 305 may be fabricated as a reflective metal film, such as, aluminum, nickel, gold, chromium, tin, or otherwise. The dimensions of in-coupling mirrors 300 may be adjusted for a particular application; however, an example dimension set may include D=70 μm, E=108 μm, F=437 μm, and G=32.98°. Of course, other dimensions/angles may be used. It should be appreciated that the figures are not drawn to scale.

Figure 3B:
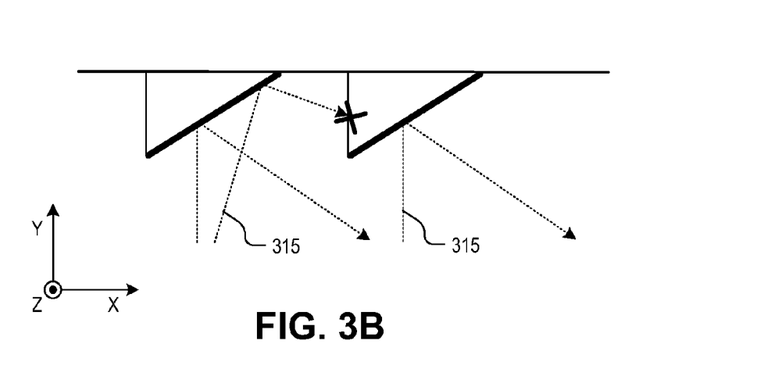
FIG. 3B is a top view illustrating in-coupling mirrors inappropriately spaced, in accordance with an embodiment of the invention.

The inter-mirror separation spacing (dimension F) may be selected for a variety characteristics, including image resolution, image brightness, transparency of in-coupling region, etc. However, an additional consideration is based upon the expected incident angles of input light 315 and angle G. As illustrated in FIG. 3B, when considering the extremes of the incident angles of input light 315 for which waveguide 200 is intended to pass, the inter-mirror separation spacing should be sufficiently large such that these extreme incident angles are not blocked by the backside of an adjacent in-coupling mirror.

Figure 4:
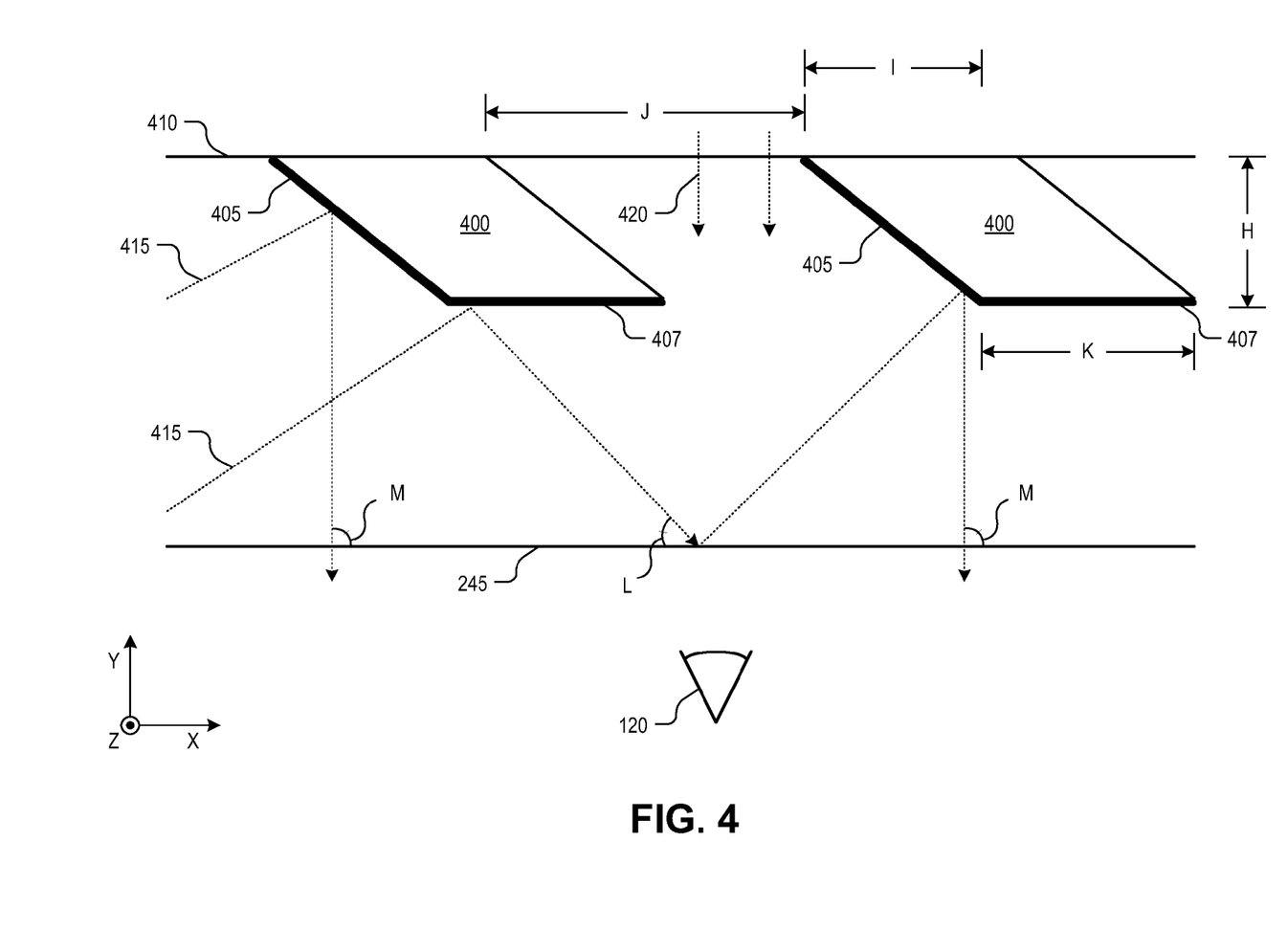
FIG. 4 is a top view illustrating out-coupling mirrors, in accordance with an embodiment of the invention.

FIG. 4 is a top view illustrating out-coupling mirrors 400, in accordance with an embodiment of the invention. Out-coupling mirrors 400 represent one possible implementation of out-coupling mirrors 230. The illustrated embodiment of out-coupling mirrors 400 are structures each having a parallelogram cross-section with two flat reflective surfaces: surface 405 orientated obliquely to emission surface 245 and surface 407 orientated substantially parallel with emission surface 245. These structures are disposed along a planar surface 410 and offset from one another to reflect a different portion of guided light 415. In one embodiment, reflective surfaces 405 and 407 are non-optically-transmissive surfaces. For example, reflective surfaces 405 and 407 may be fabricated as a reflective metal film, such as, aluminum, nickel, gold, chromium, tin, or otherwise. The dimensions of out-coupling mirrors 400 may be adjusted for a particular application; however, an example dimension set may include H=70 μm, I=108 μm, J=85 μm, and K=100 μm. Of course, other dimensions may be used. It should be appreciated that the figures are not drawn to scale.

In the illustrated embodiment of out-coupling mirrors 400, reflective surface 407 is provided to increase the field of view and spread the output light over a greater extent of emission surface 245. As guided light 415 propagates down waveguide 200 from intermediate region 215 into out-coupling region 220, some rays will immediately strike one of the oblique reflective surfaces 405 located closer to intermediate region 215. These light rays are reflected with an angle of incidence (angle M) sufficiently large (or sufficiently close to normal with respect to emission surface 245) that they exit waveguide 200 towards eye 120 as the output light. However, other rays of guided light 415 entering into out-coupling region 220 from intermediate region 215 strike one of the substantially parallel reflective surfaces 407. These rays are reflected with an angle of incidence (angle L) sufficiently small that they are reflected off emission surface 245 and continue propagating down out-coupling region 220 until they strike an oblique reflective surface 405 and exit waveguide 200. Thus, the output light is laterally extended over a larger area of emission surface 245. Reflective surfaces 407 operate to increase the output efficiency of waveguide 200 and extend the emission field of view (e.g., potentially achieving a 45 degree field of view). In this manner, oblique reflective surfaces 405 may be thought of as exit mirrors while substantially parallel reflective surfaces 407 may be thought of as propagation mirrors.

In one embodiment, out-coupling region 220 is partially transparent to pass external light 420 through surfaces 410 and 245 to eye 120. Since reflective surfaces 405 and 407 may be fabricated of non-optically-transmissive material, the degree of transparency of out-coupling region 220 can be adjusted by appropriate selection of dimension J between adjacent out-coupling mirrors 400. By increasing the proportion of unobstructed surface 410 that falls between out-coupling mirrors 400, the transparency of out-coupling region 220 can be increased. In one embodiment, a non-reflective coating may be applied to planar surface 410 in the out-coupling region 220 to reduce reflections of external light 420 when entering waveguide 200.

Figure 5:
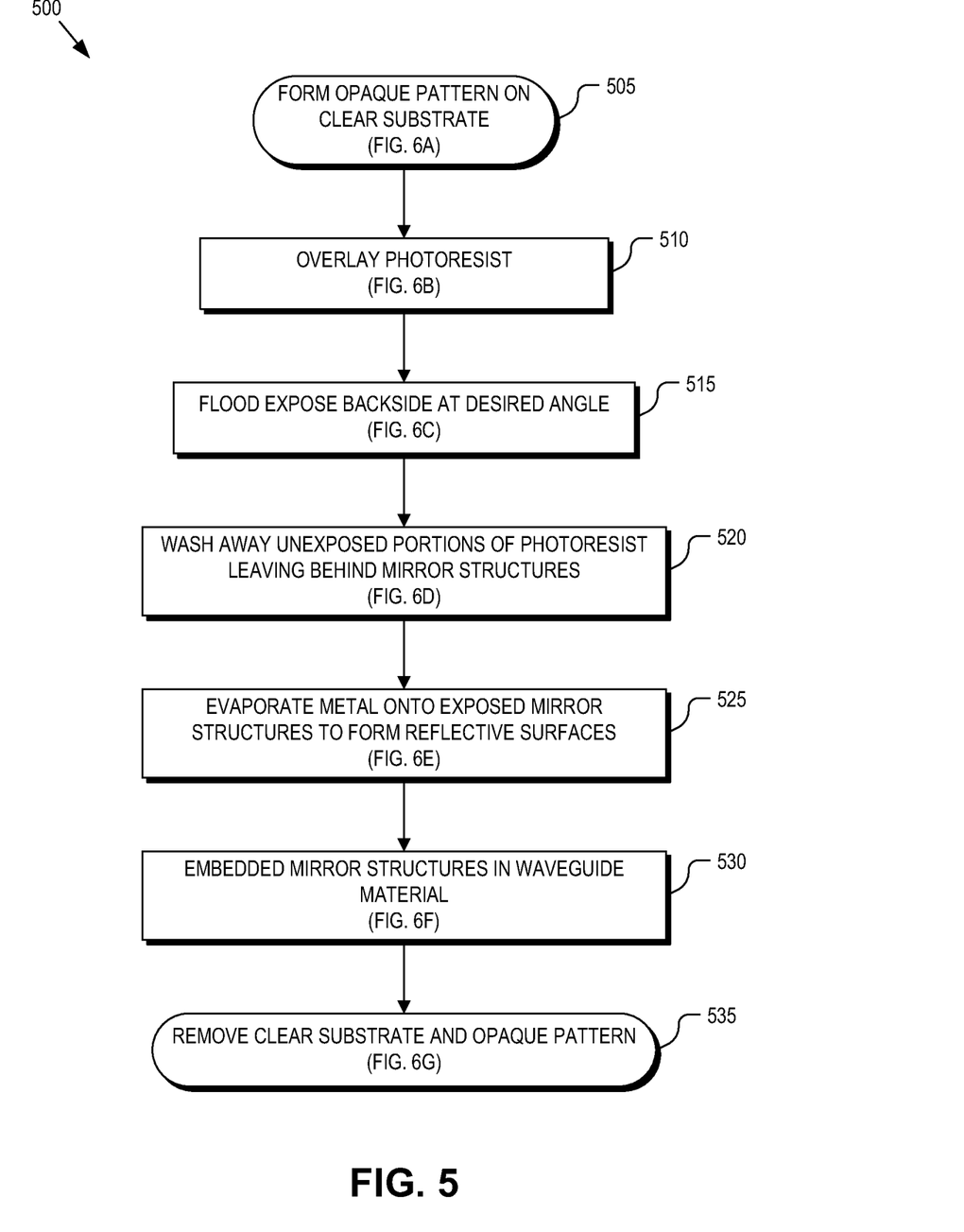
FIG. 5 is a flow chart illustrating an example process for fabricating a waveguide with embedded mirrors, in accordance with an embodiment of the invention.
Figure 6A:
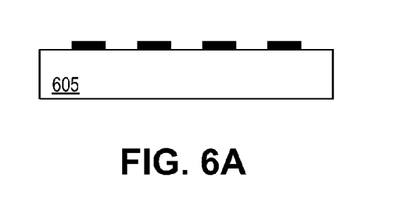
FIGS. 6A-G illustrate the example process for fabricating a waveguide with embedded mirrors, in accordance with an embodiment of the invention.
Figures 6B, 6D:
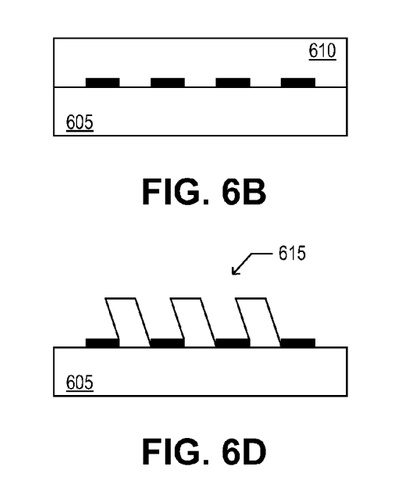
Figure 6C:
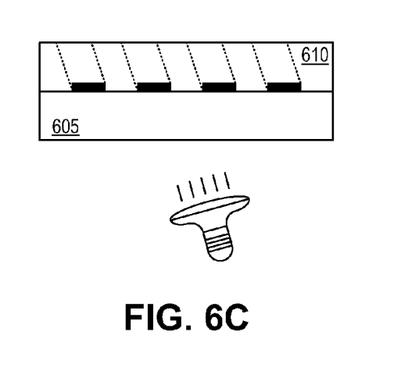
Figure 6E:
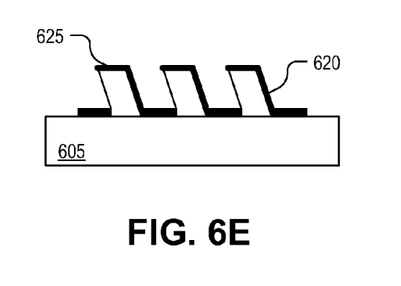
Figure 6F:
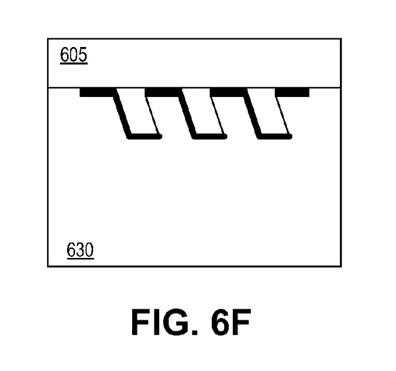
Figure 6G:
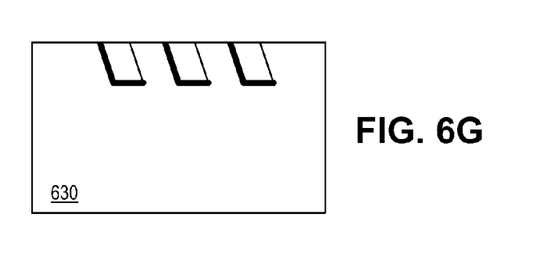

FIG. 5 is a flow chart illustrating an example process 500 for fabricating waveguide 200 with embedded mirrors, in accordance with an embodiment of the invention. Process 500 is described with reference to FIGS. 6A-G. The order in which some or all of the process blocks appear in process 500 should not be deemed limiting. Rather, one of ordinary skill in the art having the benefit of the present disclosure will understand that some of the process blocks may be executed in a variety of orders not illustrated.

In a process block 505, an opaque pattern is formed on a clear substrate 605 (e.g., glass substrate). In one embodiment, the opaque pattern is formed of metal. Once formed, the opaque pattern is covered over with a negative photoresist 610 (process block 510; see FIG. 6B), such as Su8 for example, and flood exposed from the backside through clear substrate 605 (process block 515; see FIG. 6C). After backside flood exposure, the unexposed portions of photoresist 610 protected by the opaque pattern are washed away with developer leaving behind mirror structures 615 (process block 520; see FIG. 6D). In a process block 525, reflective material (e.g., metal) is evaporated or otherwise formed onto the exposed surfaces of mirror structures 615 to form reflective surfaces 620 and 625 (see FIG. 6E). In a process block 530, the reflectively coated mirror structures 615 are embedded into a waveguide material 630, such as clear polymer (see FIG. 6F). Finally, in a process block 535, clear substrate 605 and the opaque pattern may be optionally removed using chemical mechanical polishing ("CMP") or otherwise (see FIG. 6G). If clear substrate 605 is retained, then a reflective surface (e.g., metal) may be disposed onto clear substrate 605 prior to embedding into waveguide material 630 to provide a reflective interface for guiding light within the waveguide, since clear substrate 605 may affect TIR.

Process 500 illustrates the fabrication of out-coupling mirrors 400 of FIG. 4. However, it can be readily modified to fabricate in-coupling mirrors 300 or a variety of other shaped in-coupling and/or out-coupling mirror structures. It should be appreciated that process 500 only represents one possible method of fabrication. Other techniques may be used as well. For example, gray-scale lithography may be used in place of the opaque pattern and backside flood exposure.

Figure 7:
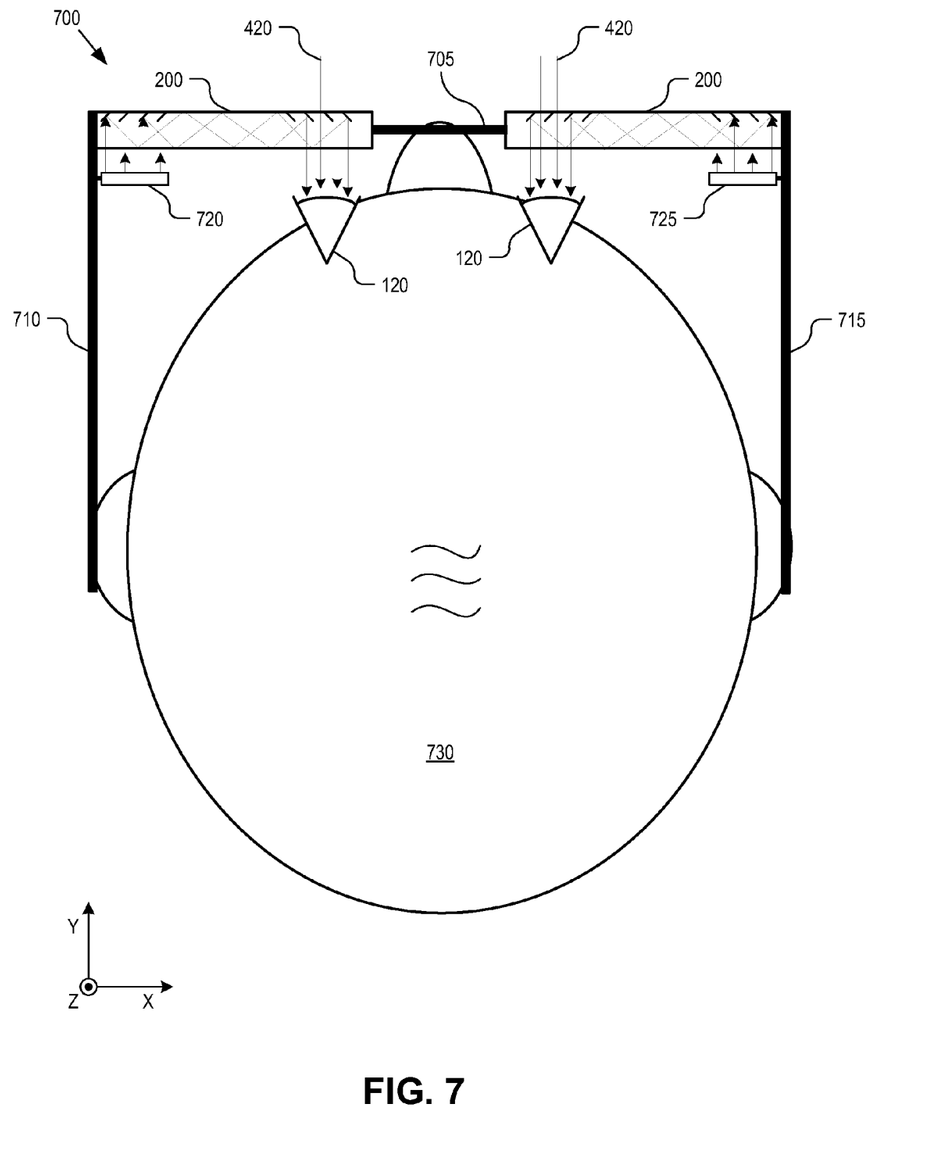
FIG. 7 is a top view of a near-to-eye imaging system using two waveguides with embedded mirrors, in accordance with an embodiment of the invention.

FIG. 7 is a top view of a demonstrative near-to-eye imaging system 700 including two waveguides with embedded mirrors, in accordance with an embodiment of the invention. The illustrated embodiment of imaging system 700 includes two waveguides 200, a frame including a nose assembly 705, left ear assembly 710, and right ear assembly 715, and two image sources 720 and 725.

The two waveguides 200 are secured into an eye glass arrangement that can be worn on a head 730 of a user. The left and right ear assemblies 710 and 715 rest over the user's ears while nose assembly 705 rests over the user's nose. The frame assembly is shaped and sized to position out-coupling region 220 of each waveguide 200 in front of a corresponding eye 120 of the user with the emission surfaces facing eyes 120.

The illustrated embodiment is capable of displaying an augmented reality to the user. As such, out-coupling region 220 of each waveguide 200 is partially transparent and permits the user to see a real world image via external light 420. Left and right (binocular embodiment) CGIs are generated by image sources 720 and 725, respectively. In one embodiment, image sources 720 and 725 are liquid crystal on silicon ("LCoS") micro-projectors that use laser lamps and emit collimated light. Of course, other display technology may be used. The CGI output by image sources 720 and 725 is launched into their respective waveguides 200 at in-coupling regions 205, guided through intermediate regions 215, and emitted from out-coupling regions 220 near-to-eyes 120. Since waveguides 200 preserve a one-to-one relation of input light angles to output light angles, the output light is also collimated and therefore virtually projected at infinity. Although the human eye is typically incapable of bring objects within a few centimeters into focus, since the output light is virtually displayed at infinity it is readily in focus. The CGI is seen by the user as a virtual image superimposed over the real world as an augmented reality.

Although FIG. 7 illustrates image sources 720 and 725 as projecting images normal to waveguides 200, in other embodiments, optical elements (e.g., lenses, mirrors, etc.) maybe placed between image sources 720 and 725 and waveguides 200, such that the CGI light may be launched into in-coupling regions 205 at oblique angles.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
a waveguide including an in-coupling region for receiving input light into the waveguide and an out-coupling region for emitting output light from the waveguide;
a plurality of in-coupling mirrors disposed within the in-coupling region of the waveguide and orientated to reflect the input light down the waveguide towards the out-coupling region as guided light, wherein the in-coupling mirrors are laterally offset from one another within the in-coupling region to each reflect a different lateral portion of the input light while not reflecting the different lateral portions of the input light directed to other in-coupling mirrors; and
a plurality of out-coupling mirrors disposed within the out-coupling region of the waveguide and orientated to reflect the guided light out of the waveguide as the output light, wherein the out-coupling mirrors each include:
a first reflective surface orientated to reflect the guided light as the output light for emission from the out-coupling region; and
a second reflective surface obliquely angled relative to the first reflective surface and orientated to reflect the guided light for propagation further down the out-coupling region of the waveguide, wherein the first and second reflective surfaces are reflective, non-optically transmissive surfaces,
wherein the out-coupling mirrors are offset from one another such that the out-coupling region comprises a partially transparent region permitting external light to pass through the out-coupling region between the out-coupling mirrors.

2. The apparatus of claim 1, wherein the waveguide includes an intermediate region disposed between the in-coupling region and the out-coupling region for guiding the guided light between the in-coupling region and the out-coupling region.

3. The apparatus of claim 2, wherein the intermediate region guides the guided light at least partially by total internal reflection.

4. The apparatus of claim 2, wherein the intermediate region includes at least one metallic reflective layer disposed along a side of the intermediate region and wherein the intermediate region guides the guided light at least partially by reflection off of the metallic reflective layer.

5. The apparatus of claim 1, wherein the in-coupling mirrors and the out-coupling mirrors each comprise structures having flat reflective surfaces, wherein the structures of the out-coupling mirrors are offset from one another each for reflecting a different portion of the guided light.

6. The apparatus of claim 5, wherein the flat reflective surfaces of the in-coupling and out-coupling mirrors are reflective, non-optically-transmissive surfaces.

7. The apparatus of claim 1, wherein the in-coupling mirrors each comprise a structure disposed within the waveguide having a substantially triangular cross-section with a reflective surface orientated to form an oblique angle to a light incident side of the in-coupling region.

8. The apparatus of claim 7, wherein the in-coupling mirrors are disposed along a planar surface of the in-coupling region of the waveguide.

9. The apparatus of claim 1, wherein the first reflective surface is orientated to form an oblique angle with a surface of the waveguide where the output light emerges from the out-coupling region and wherein the second reflective surface is orientated substantially parallel to the surface of the out-coupling region where the output light emerges.

10. The apparatus of claim 1, further comprising at least one of a light absorbing surface, an anti-reflective surface, or a light scattering surface disposed on an end region of the waveguide adjacent to the out-coupling region to inhibit the guided light from reflecting back down the waveguide towards the in-coupling region.

11. The apparatus of claim 1, wherein the waveguide comprises a polymer material.

12. The apparatus of claim 1, wherein there is a same number of the in-coupling mirrors as there is of the out-coupling mirrors.

13. The apparatus of claim 1, wherein the in-coupling mirrors are the first reflective surfaces in a path of the input light after entering into the waveguide.

14. An optical system for rendering an augmented reality to a user, the optical system comprising:
a waveguide including:
an in-coupling region for receiving input light and an out-coupling region for emitting output light;
a plurality of in-coupling mirrors disposed within the in-coupling region and orientated to reflect the input light towards the out-coupling region as guided light, wherein the in-coupling mirrors are laterally offset from one another within the in-coupling region to each reflect a different lateral portion of the input light, wherein the in-coupling mirrors are non-optically transmissive surfaces to the input light; and a plurality of out-coupling mirrors disposed within the out-coupling region and orientated to reflect the guided light out of the waveguide to an eye of the user as the output light, wherein the out-coupling mirrors are reflective, non-optically transmissive surfaces, wherein the out-coupling mirrors are offset from one another such that the out-coupling region comprises a partially transparent region permitting external light to pass through the out-coupling region between the out-coupling mirrors;

an image source positioned to launch a computer generated image into the in-coupling region of the waveguide; and a frame assembly to support the waveguide and the image source for wearing on a head of the user.

15. The optical system of claim 14, wherein the in-coupling mirrors and the out-coupling mirrors each comprise structures having flat reflective surfaces, wherein the structures of the in-coupling mirrors are offset from one another each for reflecting a different portion of the input light, wherein the structures of the out-coupling mirrors are offset from one another each for reflecting a different portion of the guided light.

16. The optical system of claim 14, wherein the in-coupling mirrors are disposed along a planar surface of the in-coupling region of the waveguide.

17. The optical system of claim 14, wherein the out-coupling mirrors each comprise:

a first reflective surface orientated to form an oblique angle with a surface of the waveguide where the output light emerges from the out-coupling region; and a second reflective surface orientated substantially parallel to the surface of the out-coupling region where the output light emerges.

18. The optical system of claim 14, wherein there is a same number of the in-coupling mirrors as there is of the out-coupling mirrors.

19. A method of displaying a near-to-eye image, the method comprising:

receiving input light into an in-coupling region of a waveguide;

reflecting different portions of the input light with a corresponding plurality of in-coupling mirrors disposed within the in-coupling region of the waveguide, wherein the in-coupling mirrors are laterally offset from one another within the in-coupling region to each reflect a different lateral portion of the input light, wherein the in-coupling mirrors are non-transmissive to the input light;

guiding the input light reflected off the in-coupling mirrors as guided light guided towards an out-coupling region of the waveguide;

reflecting different portions of the guided light with a corresponding plurality of out-coupling mirrors disposed within the out-coupling region of the waveguide for emission from the out-coupling region as output light, wherein the out-coupling mirrors are reflective, non-optically transmissive surfaces; and passing external light through the out-coupling region between the out-coupling mirrors, wherein the out-coupling mirrors are offset from one another such that the out-coupling region comprises a partially transparent region to the external light.

20. The method of claim 19, wherein the input light and the output light is collimated.

21. The method of claim 19, wherein the in-coupling mirrors and the out-coupling mirrors each comprise structures having flat reflective surfaces, wherein the structures of the in-coupling mirrors are offset from one another each for reflecting a different portion of the input light, wherein the structures of the out-coupling mirrors are offset from one another each for reflecting a different portion of the guided light.

22. The method of claim 21, wherein the flat reflective surfaces of the in-coupling and out-coupling mirrors are reflective, non-optically-transmissive surfaces.

23. The method of claim 19, wherein reflecting different portions of the guided light with the plurality of out-coupling mirrors comprises:

reflecting a first portion of the guided light off of first reflective surfaces orientated to form an oblique angle with a surface of the waveguide where the output light emerges from the out-coupling region, the first portion for immediate emission from the waveguide; and reflecting a second portion of the guided light off of second reflective surfaces orientated substantially parallel to the surface of the out-coupling region where the output light emerges, the second portion for propagating further down the out-coupling region prior to emerging from the waveguide as the output light.

24. An apparatus, comprising:

a waveguide including an in-coupling region for receiving input light into the waveguide and an out-coupling region for emitting output light from the waveguide;

a plurality of in-coupling mirrors disposed within the in-coupling region of the waveguide and orientated to reflect the input light down the waveguide towards the out-coupling region as guided light; and a plurality of out-coupling mirrors disposed within the out-coupling region of the waveguide and orientated to reflect the guided light out of the waveguide as the output light, wherein the out-coupling mirrors each include:

a first reflective surface orientated to reflect the guided light as the output light for emission from the out-coupling region; and a second reflective surface obliquely angled relative to the first reflective surface and orientated to reflect the guided light for propagation further down the out-coupling region of the waveguide, wherein the second reflective surface is disposed internal to the waveguide and offset from an external side surface of the waveguide, wherein the plurality of out-coupling mirrors are laterally offset from each other with intervening gaps between adjacent out-coupling mirrors such that the second reflective surface of each of the out-coupling mirrors is separate from the second reflective surface of other out-coupling mirrors, wherein the out-coupling mirrors are reflective, non-optically transmissive surfaces and are offset from one another such that the out-coupling region comprises a partially transparent region permitting external light to pass through the out-coupling region in the intervening gaps between the out-coupling mirrors.

* * * * *